United States Patent
Somayazulu et al.

(10) Patent No.: US 6,882,679 B2
(45) Date of Patent: Apr. 19, 2005

(54) EXTENSION OF WIRELESS LOCAL AREA NETWORK COMMUNICATION SYSTEM TO ACCOMMODATE HIGHER DATA RATES WHILE PRESERVING LEGACY RECEIVER FEATURES

(75) Inventors: V. Srinivasa Somayazulu, Tigard, OR (US); Srinivas Kandala, Vancouver, WA (US); John M. Kowalski, Vancouver, WA (US); Chan K. Park, Glendale, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 884 days.

(21) Appl. No.: 09/753,048

(22) Filed: Dec. 29, 2000

(65) Prior Publication Data

US 2002/0131478 A1 Sep. 19, 2002

(51) Int. Cl.[7] ............... H04B 1/69; H04B 15/00; H04L 27/20
(52) U.S. Cl. ............... 375/146; 375/308; 375/200
(58) Field of Search ............... 375/147, 146, 375/259, 284, 200

(56) References Cited

U.S. PATENT DOCUMENTS

| 5,515,396 A | * | 5/1996 | Dalekotzin | 375/142 |
| 5,982,807 A | * | 11/1999 | Snell | 375/146 |
| 6,122,310 A | * | 9/2000 | Ziemer et al. | 375/142 |
| 6,473,449 B1 | * | 10/2002 | Cafarella et al. | 375/141 |
| 6,678,310 B1 | * | 1/2004 | Andren et al. | 375/147 |

OTHER PUBLICATIONS

Draft Supplement to Standard For Information Technology—Telecommunications and Information Exchange Between Systems— Specific Requirements— Part 11: Wireless LAN Medium Access Control (MAC) and Physical Layer (PHY) specifications: Higher Speed Physical Layer (PHY) Extension in the 2.4 GHz Band, 1999, IEEE P802.11b/D4.0, IEEE, USA.

Webster, Mark and Andren, Carl; Harris/Lucent CCK Description: Additional Covercode and Fast Transform Detail; Sep., 1998; doc,: IEEE 802. 11–98/331; Harris Semiconductor, Melborune, FL.

Andren, Carl and Webster, Mark; CCK Modulation Delivers 11 Mbps for High Rate IEEE 802.11 Extension, 1999, Harris Semiconductor, Palm Bay, FL.

Pearson, Bob; Complementary Code Keying Made Simple, Application Note AN9850.1; May 2000; Intersil Corporation, Melbourne, FL.

* cited by examiner

Primary Examiner—Stephen Chin
Assistant Examiner—Cicely Ware
(74) Attorney, Agent, or Firm—Chernoff, Vilhauer, McClung & Stenzel, LLP

(57) ABSTRACT

In a direct sequence spread spectrum data communication system an information bit is mixed with a pseudorandom noise or spreading code to produce modulated codeword for transmission. A method of bandwidth efficient M-ary phase shift key modulation encoding at least 16 bits of data to a single codeword is disclosed for extending the data rate of a spread spectrum system. Interoperability with legacy devices is maximized by maintaining structural similarity between the modulated waveforms of the extended data rate and legacy systems.

9 Claims, 6 Drawing Sheets

| $\varphi_1$ | | |
|---|---|---|
| Data Bits ($d_3, d_2, d_1, d_0$) | Phase Change (Even Codewords) | Phase Change (Odd Codewords) |
| 0000 | 0 | π |
| 0001 | π/8 | π+π/8 |
| 0011 | π/4 | π+ π/4 |
| 0010 | 3π/8 | π+3π/8 |
| 0110 | π/2 | π+π/2 |
| 0111 | 5π/8 | π+5π/8 |
| 0101 | 3π/4 | π+3π/4 |
| 0100 | 7π/8 | π+7π/8 |
| 1100 | π | 0 |
| 1101 | 9π/8 | π+9π/8 |
| 1111 | 5π/4 | π+5π/4 |
| 1110 | 11π/8 | π+11π/8 |
| 1010 | 3π/2 | π+3π/2 |
| 1011 | 13π/8 | π+13π/8 |
| 1001 | 7π/4 | π+7π/4 |
| 1000 | 15π/8 | π+15π/8 |

FIG. 6

EXTENSION OF WIRELESS LOCAL AREA NETWORK COMMUNICATION SYSTEM TO ACCOMMODATE HIGHER DATA RATES WHILE PRESERVING LEGACY RECEIVER FEATURES

CROSS-REFERENCE TO RELATED APPLICATIONS

Not applicable.

BACKGROUND OF THE INVENTION

The present invention relates to a wireless local area network (WLAN) and, more particularly, to a method of extending the data rate of a WLAN while maintaining interoperability with existing networks based on a lesser data rate.

A wireless local area network (WLAN) is a data communication system implemented as an extension of or alternative to a wired data communication network (LAN). A WLAN provides location independent access between computing devices using radio frequency or other wireless communication techniques. WLANs have been or are being developed to conform to a number of standards, including the IEEE 802.11, Bluetooth and HomeRF standards. The IEEE 802.11 standard, INFORMATION TECHNOLOGY-TELECOMMUNICATIONS AND INFORMATION EXCHANGE BETWEEN SYSTEMS-LOCAL AND METROPOLITAN AREA NETWORKS—SPECIFIC REQUIREMENTS—PART 11: WIRELESS LAN MEDIUM ACCESS CONTROL AND PHYSICAL LAYER (PHY) SPECIFICATIONS, Institute of Electrical and Electronics Engineers, was approved in 1997 and a supplement providing for higher data rate WLANs, IEEE 802.11b, WIRELESS LAN MEDIUM ACCESS CONTROL (MAC) AND PHYSICAL LAYER (PHY) SPECIFICATIONS: HIGHER SPEED PHYSICAL LAYER (PHY) EXTENSION IN THE 2.4 GHz BAND, was approved in 1999. The IEEE 802.11 standards define a protocol and a compatible interface for data communication in a local area network via radio or infrared-air transmission. While the standard defines an infrared-air communication interface, radio frequency (RF) communication is the most commonly used communication method for WLAN implementation.

The IEEE 802.11 standard defines the physical layer (PHY) and a media access control (MAC) sublayer for WLANs with data rates of 1 Mbits/s or 2 Mbits/s using either frequency hopping spread spectrum (FHSS) or direct sequence spread spectrum (DSSS) RF communication techniques. These RF systems operate in the 2.4 GHz, ISM (Instrument, Scientific, and Medical) frequency band. As defined by local regulations, the ISM band extends from 2.4000–2.4835 GHz in the U.S., Canada and much of Europe. A similar, if not identical frequency band, is set aside for use by unlicensed RF radiators in several other countries.

For a frequency hopping system, the transmission frequency is periodically shifted in a pseudorandom pattern known to both the transmitter and the receiver. For North America and most of Europe, 79 hop channels of 1 MHz and a maximum channel dwell time of 400 ms are specified for IEEE 802.11 FHSS systems. FHSS permits a simpler transceiver design than that required for a DSSS system. However, high bit packing coding schemes required for reliable operation of FHSS in the narrow channels prescribed by the regulations become impractical at high data rates due to high signal-to-noise ratios. As a result, the data rate of practical FHSS, ISM band systems is relatively limited and DSSS is the technique of choice for higher data rate WLANs.

In a DSSS system, the modulated signal is spread over a transmission bandwidth greater than that required for the baseband information signal by directly modulating the baseband information signal with a pseudorandom noise (PN) or spreading code that is known to both the transmitter and the receiver. Each data bit of the baseband information is mixed with each of a plurality of chips or bits of the spreading code. For example, the spreading code for DSSS wireless networks conforming to the basic IEEE 802.11 standard is a Barker sequence comprising eleven chips having the sequence "01001000111" (non-polar signal) or "+1, −1, +1, +1, −1, +1, +1, +1, −1, −1, −1" (non-return to zero (NRZ) or polar signal). Referring to FIG. 1, each bit of the baseband data 20 is mixed (Exculsive-ORed) 22 with the eleven chips of the Barker sequence 24 to form an 11-chip codeword. A logic "0" baseband information bit is encoded as a first codeword 26 and a logic "1" is encoded as a second chip sequence or codeword 28.

The resulting multi-chip symbol or codeword is transmitted in the bit period of the baseband data bit or the time between the starting and ending of the baseband bit. If the bit rate for baseband information is 1 MSymbols/s, the eleven chip Barker sequence is encoded at a chipping rate of 11 MHz. In a phase shift key (PSK) modulated system like the IEEE 802.11 systems, the encoded chips are transmitted as phase changes in the transmitted signal. Since the signal changes phase several times in the period required to transmit a single data bit, the frequency bandwidth must be wider than that required for the baseband. When the signal is demodulated, the frequency spreading is reversed and signals from potentially interfering radiators are eliminated decreasing the likelihood that the signal of interest will be jammed.

IEEE 802.11 compliant DSSS systems utilize differential phase shift keying where the relative phase difference between the waveforms received during successive codeword intervals indicates the value of transmitted data. Differential binary phase shift keying (DBPSK) (one phase shift per information bit) modulation is used for transmission at the basic data rate of 1 Mbits/s. Differential quadrature phase-shift keying (DQPSK) (four phase shifts to encode two information bits) is used to increase the data transfer rate to 2 Mbits/s. For 2 Mbits/s DQPSK modulation, the information data stream is grouped into pairs of bits or dibits and one of four codewords is selected based on the values of the bits of a dibit. Alternate codewords are multiplied by either a first cosinusoidal phase-shift modulation signal and transmitted as a first "in-phase" (I) signal or a second 90° phase-shifted sinusoidal carrier at the same frequency and transmitted as a second "quadrature" (Q) signal. The 11-chip Barker code and a chip rate of 11 Mchip/s permits three non-overlapping DSSS channels in the ISM frequency band.

The preamble of the IEEE 802.11 data packet is used by the receiver to initiate spreading code synchronization is always transmitted as the DBPSK wave form. This permits all receivers to identify the transmitted waveform and, if the receiver is capable, switch to a higher rate mode of operation for interaction with a particular WLAN device. The header of an IEEE 802.11 data packet which includes a cyclic redundancy check code, a packet payload transmission rate indicator, and payload length signal may be transmitted as either a DBPSK or DQPSK waveform.

To achieve higher data rates, the IEEE 802.11b revision adopts Complementary Code Keying (CCK) to replace the 11-chip Barker sequence for modulating data packet payloads. Complementary codes or binary, complementary sequences are polyphase codes comprising a pair of equal finite length sequences having the property that the number of pairs of like elements with any given separation in one series is equal to the number of pairs of unlike elements with the same separation in the second series. As a set, these code sequences have unique mathematical properties that facilitate distinguishing between code words at the receiver even in the presence of substantial noise and multipath interference. For an 11 Mbits/s data rate the information data stream is divided into eight bit segments. The values of six of the data bits are used to generate one of 64 unique subcodes. The values of the two remaining data bits are used to select one of the DQPSK phases for rotating the selected subcode producing 256 possible codewords for transmission. Systems operating in the 5.5 Mbits/s mode use two data bits to generate one of four subcodes and two bits are used to select one of the four DQPSK phases. With a symbol rate of 1.375 Msymbols/s, an eight chip spreading code, and a chipping rate of 11 MHz the high data rate waveform occupies approximately the same bandwidth as that of the 2 Mbits/s DQPSK waveform of the lower rate systems. As a result, the ISM band is sufficiently wide for three non-overlapping higher data rate channels promoting interoperability of the lower and higher data rate systems.

While the higher data rate systems can operate at a substantially greater date rate than the lower data rate IEEE 802.11 systems, the maximum data rate (11 Mbits/s) is still only comparable to low data rate (10 Mbits/s) IEEE 802 "Ethernet" wired LANs. Since WLANs are envisioned as an extension of, or alternative to, a wired LAN, it is desired, therefore, to further increase the data rate of WLANs while maintaining backwards compatibility and interoperability with WLAN equipment designed to operate at lower data rates.

BRIEF DESCRIPTION OF THE DRAWINGS

FIG. 6 is a table mapping of data bits to a differentially encoded phase parameter for a codeword.

DETAILED DESCRIPTION OF THE INVENTION

A wireless local area network (WLAN) is a data communication system that can be used to either replace or extend a wired local area network (LAN) infrastructure. WLANs may be implemented in a variety of systems including networks complying with, for example, the Bluetooth, HomeRF, the IEEE 802.11 and IEEE 802.11b standards. The IEEE 802.11 standards define a physical layer (PHY) and a medium access control (MAC) sublayer for a WLAN having origins in the IEEE 802.3 Ethernet wired LAN standard.

Figure 2:
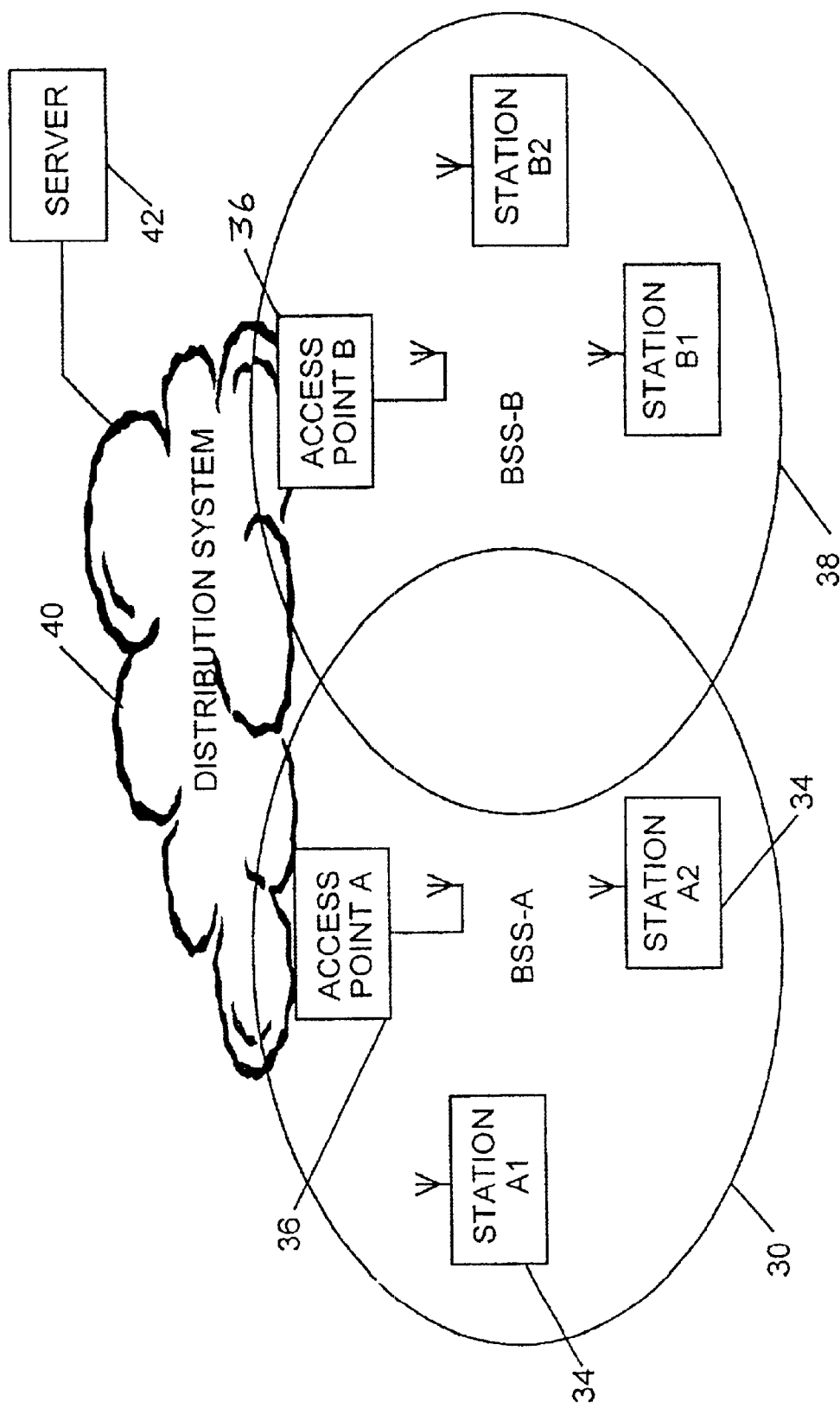
FIG. 2 is a schematic illustration of a topology of a WLAN.

Referring to FIG. 2, The basic topology of an IEEE 802.11 WLAN is referred to as a basic service set (BSS) 30 and comprises two or more wireless nodes or stations 34 that have recognized each other and established communications. If the network comprises only wireless stations 34, the RF transceivers of the stations communicate directly with each other on a peer-to-peer level sharing a given cell coverage area. This type of network is often formed on a temporary basis and is commonly referred to as an ad hoc network or independent basic service set (IBSS). In many instances, the basic service set will include an access point (AP) 36 providing a bridge between a wireless LAN and a wired LAN forming an infrastructure client server network. An access point 36 is immobile and forms part of the wired network infrastructure. The access point 36 includes an RF transceiver for wireless communication with a transceiver of at least one roaming mobile station 34. A mobile station may comprise a point-of-sale terminal, a bar code reader, a scanner, a cellular telephone, a personal computer and other types of data processing devices. When an access point 36 is available all communications between stations or between a station and a wired network client go through the access point. An additional WLAN topology is known as the extended service set (ESS). An ESS comprises a plurality of overlapping basic service sets 30 and 38 (each including an access point 36) that are connected together by means of a distribution system 40. Although the distribution system could be any type of network, it is typically a component of a wired Ethernet LAN including a server 42. Mobile stations 34 can roam between access points 36 and move from one basic service 30 set to another 38. Since WLANs are temporary networks by nature, interoperability between a wide variety of network devices is highly desirable.

The IEEE 802.11 standard specifies versions of the network physical layer that provide for either direct sequence spread spectrum (DSSS) or frequency hopping spread spectrum (FHSS) radio frequency communication in the 2.4 GHz ISM (Instrument, Scientific, and Medical) frequency band. In the U.S., Canada, and much of Europe, an ISM frequency band extending between 2.4000 GHz and 2.4835 GHz is reserved for use by unlicensed RF radiators. An identical or similar frequency band is reserved by regulation in a number of other countries for unlicensed RF operation. While frequency hopping spread spectrum systems utilize a simpler transceiver than DSSS systems, the data rate of FHSS systems is more limited than that of DSSS systems. Therefore, DSSS is the technology of choice for higher data rate systems and, in particular, the higher data rate systems specified by the IEEE 802.11b revision, WIRELESS LAN MEDIUM ACCESS CONTROL (MAC) AND PHYSICAL LAYER (PHY) SPECIFICATIONS: HIGHER SPEED PHYSICAL LAYER (PHY) EXTENSION IN THE 2.4 GHz BAND, Institute of Electrical and Electronics Engineers, 1999. For the purpose of simplifying the description of the novel modulation method, it is assumed that the transmitters and receivers operate according to the IEEE 802.11 and IEEE 802.11b DSSS standards and in accordance with the modulation method disclosed in the co-pending application referred to above. However, this assumption is for the purpose of illustration only and the methods described herein may be employed in DSSS wireless communication systems complying with other standards or even in communication systems other than wireless data processing networks.

Figure 3:
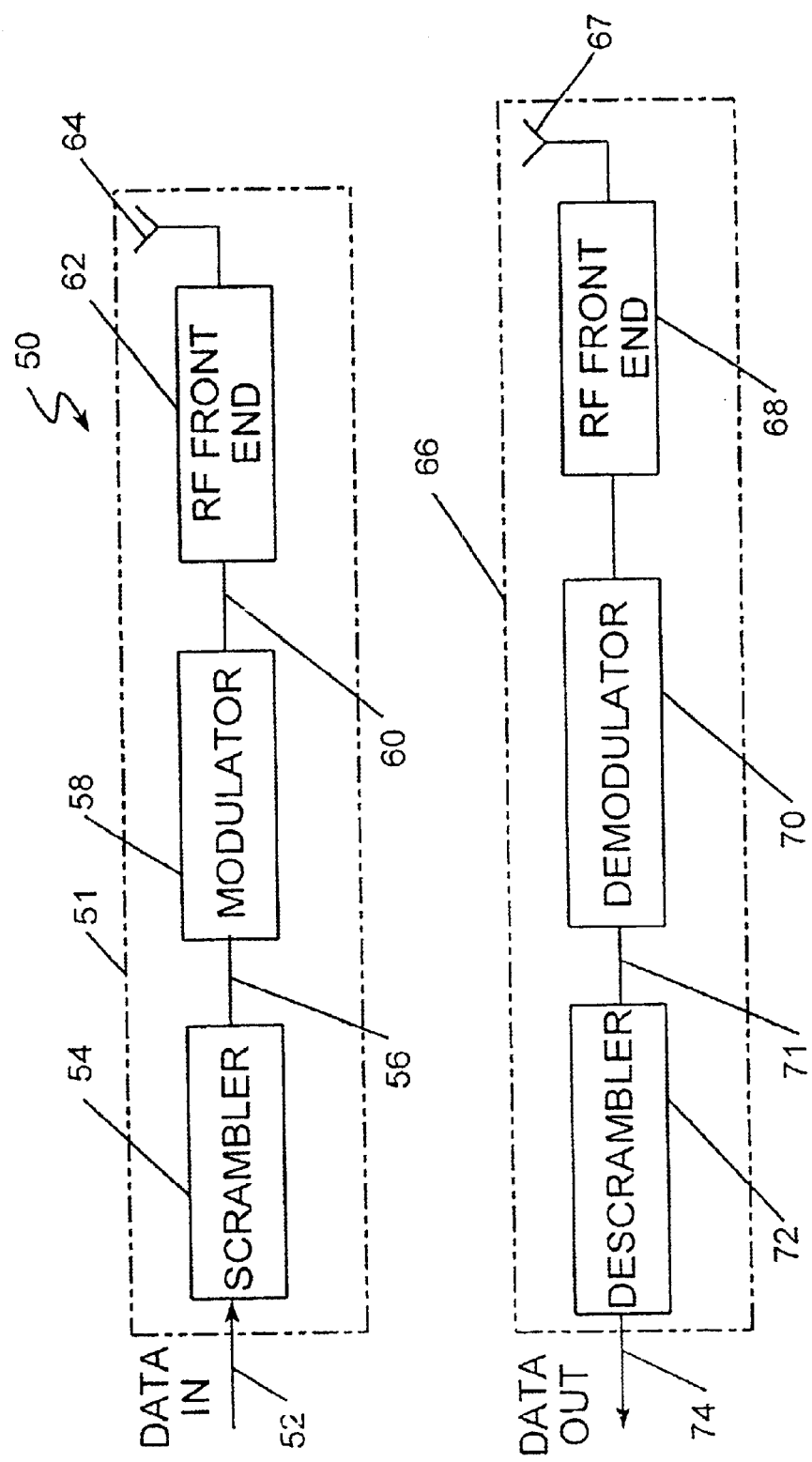
FIG. 3 is a block diagram of a direct sequence spread spectrum transceiver.

FIG. 3 illustrates a high level block diagram of a DSSS transceiver 50. In the transmitter section 51 of the transceiver 50, an input signal, DATA IN 52, is received by a scrambler 54. The scrambler 54 scrambles the input signal 52 to avoid repeating patterns in the data. The output of the scrambler 54 is the information bit stream 56 to be transmitted. The information bit stream 56 is input to a modulator 58. In the modulator 58 the information bit stream 56 is mixed with a spreading code and modulated to produce a stream of encoded codewords 60. The mixing and modulation process is typically accomplished by segmenting the serial information bitstream 56 and using the values of the information bits to select one of a number of known codewords for transmission. In an RF front end 62 the codeword signals are filtered, amplified and used to drive an antenna 64.

The signal transmitted from a transmitter antenna 64 is received by an antenna 67 of a receiver portion 66 of a transceiver 50. In the receiver 66 the process utilized in the transmitter 51 is reversed to reconstruct the data. The RF front end 68 includes conventional filtering and amplification circuitry to condition the signal and remove unwanted frequencies. In a demodulator 70 the coded signals are "de-rotated," correlated and then decoded. In the higher data rate IEEE 802.11b compliant systems, the demodulator 70 applies a fast transform with a butterfly implementation to decode the information bit stream 71. Since the transmitted signal may be distorted due to interference and multipath fading during transmission, the output of the demodulator is an estimate of the bits of the original scrambled information bit stream. The reconstructed information bit stream is unscrambled in a descrambler 72 and the reconstructed DATA OUT 74 is output by the receiver 66.

Figure 1:
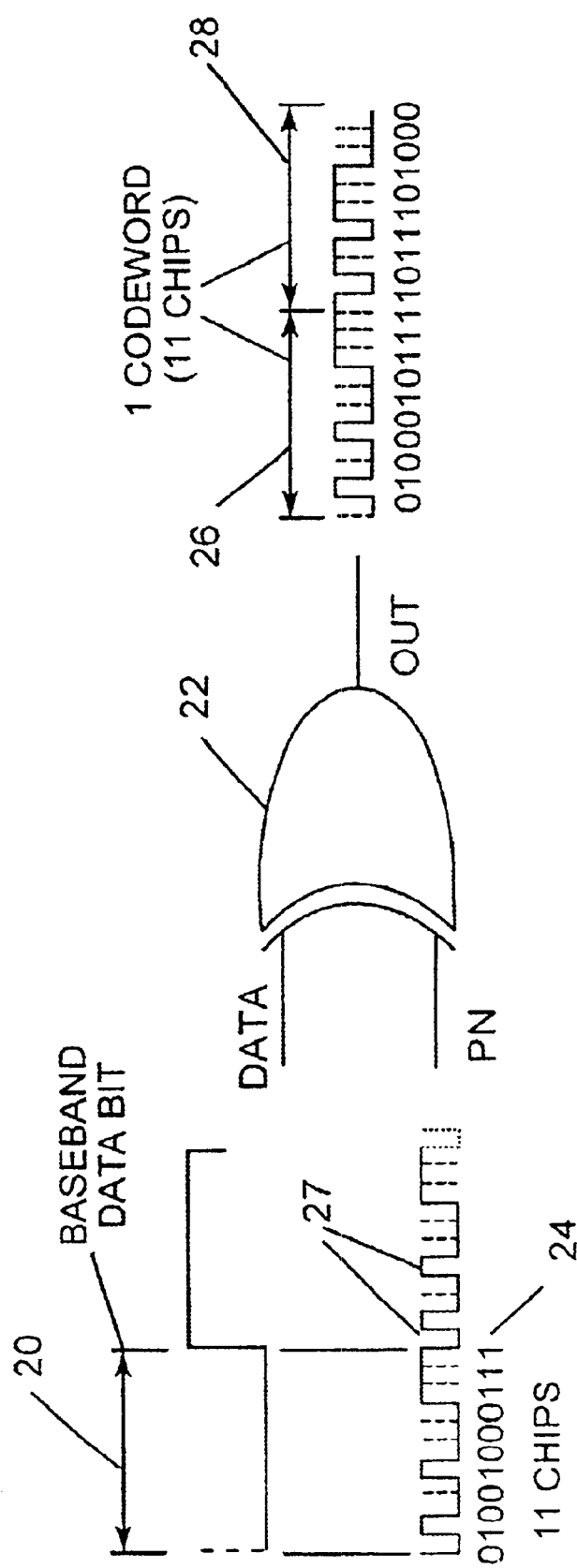
FIG. 1 is a schematic illustration of direct sequence spread spectrum modulation.

In a DSSS system, direct modulation of the baseband information signal with a pseudorandum noise (PN) or spreading code known to both the transmitter and the receiver is used to spread the modulated output signal over a greater bandwidth than the bandwidth required for the baseband information. Referring to FIG. 1, the spreading code for DSSS wireless networks conforming to the basic IEEE 802.11 standard is a Barker code sequence 24 comprising eleven chips 28 having the sequence "01001000111" (non-polar signal) or "+1, −1, +1, +1, −1, +1, +1, +1, −1, −1, −1" (non-return to zero (NRZ) or polar signal). Each data bit of information to be transmitted is mixed (or Exculsive-ORed) 22 with the chips of the Barker sequence spreading code 24. A logic "0" information bit is encoded as a first codeword sequence of 11 chips 26 and a logic "1" is encoded as a second codeword sequence 28. An entire codeword 26 or 28 is transmitted in a bit period, the interval between the beginning and end of an information data bit or symbol 20. If the information data bit rate is 1 MSymbols/s, the encoded eleven chip Barker sequence is transmitted at a chipping rate of 11 MHz.

IEEE 802.11 compliant DSSS systems utilize differential phase shift keying where the relative phase difference between the waveforms received in successive periods indicates the value of transmitted data. Since the plurality of encoded chips of a codeword are transmitted in a single bit period, the frequency bandwidth of the transmitted signal must be wider than that required for the baseband to accommodate the rapid phase changes of the encoded chips. IEEE 802.11 systems operating at the basic data rate of 1 Mbits/s utilize differential binary phase shift keying (DBPSK). Each data bit of information is used to select one 11-chip codeword for transmission. For an information data rate of 1 Mbits/s and a chipping rate of 11 Mchips/s transmitted in a 2 MHz null-to-null bandwidth, a spectrum of approximately 22 MHz is required for the DBPSK transmission of the basic system. Differential quadrature phase shift keying is used for systems operating at a 2 Mbits/s data rate. The information bit stream is segmented into successive pairs of bits or dibits. The values of the bits of each dibit are used to select one of four codewords. Successive codewords are alternately multiplied by either a cosinusoidal carrier to produce an "in-phase" (I) signal or a 90° phase-shifted sinusoidal carrier of the same frequency to produce a quadrature (Q) signal. Since two bits are coded per codeword, the transmission requires the same spectrum as is required for the lower data rate system.

The preambles of IEEE 802.11 data packets are used by the receiver to initiate spreading code synchronization and are always transmitted as the DBPSK wave form. This permits all receivers to identify the transmitted waveform. Then, if the receiver is capable, the receiver can switch to the higher data rate mode for operation in a particular WLAN device. The header of an IEEE 802.11 data packet which includes a cyclic redundancy check code, transmission rate indicator and a packet payload length indicator, may be transmitted as either a DBPSK or DQPSK waveform. The payload of the data packets for IEEE 802.11 lower data rate systems may be transmitted with either DBPSK (1Mbits/s mode) or DQPSK (2Mbits/s mode) modulation.

For higher data rate IEEE 802.11b compliant systems, packet payload modulation is accomplished with a complementary code sequence of eight complex chips instead of the 11-chip Barker sequence of the lower data rate systems. Complementary codes or binary complementary sequences are polyphase codes comprising a pair of equal finite length sequences having the property that the number of pairs of like elements with any given separation in one series is equal to the number of pairs of unlike elements with the same separation in the second series. As a set, these codes have unique mathematical properties that facilitate distinguishing between the codewords or symbols at the receiver even in the presence of substantial noise and multipath interference. With a symbol rate of 1.375 MSymbols/s, an 11 Mbits/s Complementary Code Keying (CCK) waveform occupies approximately the same spectrum as that of the 2 Mbits/s DQPSK waveform of lower rate systems. As a result, even at the higher data rates, three non-overlapping channels can occupy the ISM band facilitating interoperability with systems designed to operate in the 1 Mbits/s and 2 Mbits/s modes.

The 8-bit CCK code sequences utilized in the IEEE 802.11b higher data rate systems are derived from the formula:

$$c = \left\{ \begin{array}{l} e^{j(\varphi_1+\varphi_2+\varphi_3+\varphi_4)}, e^{j(\varphi_1+\varphi_3+\varphi_4)}, e^{j(\varphi_1+\varphi_2+\varphi_4)}, -e^{j(\varphi_1+\varphi_4)}, \\ e^{j(\varphi_1+\varphi_2+\varphi_3)}, e^{j(\varphi_1+\varphi_3)}, -e^{j(\varphi_1+\varphi_2)}, e^{j\varphi_1} \end{array} \right\}$$

where c is the codeword having the least significant bit first and the most significant bit last. The phase parameters $\Phi 1$, $\Phi 2$, $\Phi 3$, and $\Phi 4$ determine the phase values of the chips of complex code words and are defined in the IEEE 802.11b standard. The coding is a form of the Hadamard transform encoding where $\Phi 4$ is included in all chips, $\Phi 2$ is included in all odd chips, $\Phi 3$ is included in all odd pairs of chips, and $\Phi 4$ is included in all odd quads of chips.

Since the phase parameter $\phi_1$ is common to all chips, terms including $\phi_1$ can be factored from the codeword to produce a subcode that is a function of the phase parameters $\phi_2$, $\phi_3$, and $\phi_4$ as follows:

$$c_s = \begin{Bmatrix} e^{j(\varphi_2+\varphi_3+\varphi_4)}, e^{j(\varphi_3+\varphi_4)}, e^{j(\varphi_2+\varphi_4)}, -e^{j(\varphi_4)}, \\ e^{j(\varphi_2+\varphi_3)}, e^{j(\varphi_3)}, -e^{j(\varphi_2)} \end{Bmatrix}$$

where:

$$c = c_s \cdot e^{j\phi_1}$$

For operation at the 11 Mbits/s mode, the serial information data stream is partitioned into bytes comprising bits (d7, d6, d5 . . . , d0) where d0 is the least significant bit and is first in time. The values of six bits of each byte (dibits ($d_2$, $d_3$), ($d_4$, $d_5$), and ($d_6$, $d_7$)) encode the phase parameters $\phi_2$, $\phi_3$, and $\phi_4$ as follows:

| Data Bits ($d_i$, $d_{i+1}$) | Phase ($\phi_k$) |
|---|---|
| 00 | 0 |
| 01 | π/2 |
| 10 | π |
| 11 | 3 π/2 |

Typically, the values of the six bits are used to select one of 64 subcodes having phase parameters mapped from the input data bits as indicated above.

For operation in the 5.5 Mbits/s mode, the serial data stream is partitioned into four bit (nibble) segments. The values of the bits $d_2$ and $d_3$ of each nibble are used to select one of four subcodes having a phase parameter mapped according to the table above.

The phase parameter $\phi_1$ modifies all of the chips of the codeword and is used in the DQPSK modulation of the selected subcodes. Differential modulation is performed by rotating each successive codeword 180° (π) relative to its predecessor. The phase parameter $\phi_1$, therefore, is determined from the values of the bits $d_0$ and $d_1$ of the bit stream segment and the position of the codeword in the stream of codewords, as follows:

| Data Bits ($d_0$, $d_1$) | Phase change (+jω) Even codeword | Phase change (+jω) Odd codeword |
|---|---|---|
| 00 | 0 | π |
| 01 | π/2 | 3 π/2 |
| 11 | π | 0 |
| 10 | 3 π/2 | π/2 |

As a result, in the 11 Mbits/s operating mode eight data bits select one of 256 codewords and in the 5.5 Mbits/s operating mode four bits select one of 64 codewords which are a subset of the codewords used for the higher data rate mode.

To further extend the data rate of a DSSS WLAN while maximizing the interoperability with legacy systems, the present inventors concluded that the extended data rate system should comprise a modulation method providing an extended data rate while being able to recognize a legacy device so that the extended rate system can select a lower data rate operating mode for communication with the legacy devices. Further, the inventors concluded that utilization of structurally similar codewords, of the same length and coded at the same rate as legacy devices would maximize interoperability between the legacy and extended rate systems. Therefore, the inventors concluded that the packet preamble and header of the extended data rate system should utilize the DPSK and DQPSK modulation used by legacy systems. To extend the data rate, bandwidth efficient multilevel modulation using M-PSK (M-ary phase shift keying) is used to modulate the packet payload.

Figure 4:
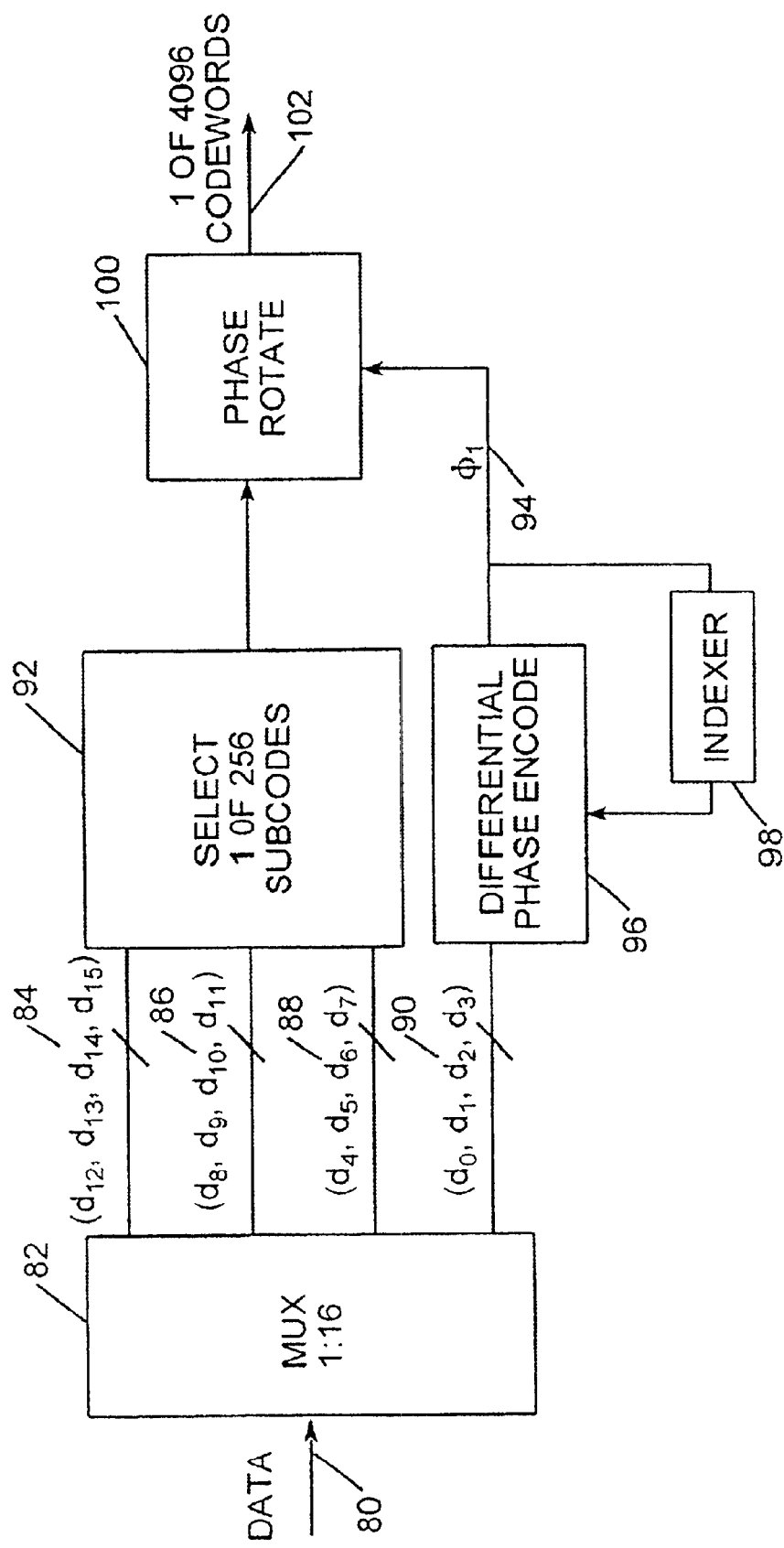
FIG. 4 is a block diagram of a modulator for a direct sequence spread spectrum communication system employing the modulation of the present invention.
Figure 5:
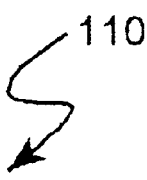
FIG. 5 is a table mapping of data bits to a plurality of codeword phase parameters.

To attain a 22 Mbits/s data rate with a symbol rate of 1.375 Mbits/s requires each transmitted codeword encode 16 data bits (16-PSK modulation). Referring to FIG. 4, for 16-PSK modulation the serial information data bit stream 80 is partitioned into 16-bit words (bits d0–d15) by a serial to parallel converter 82. The words are further divided into four bit nibbles 84, 86, 88 and 90 at the output of the converter 82. The values of the bits in each nibble are mapped to the phase parameters Φ1, Φ2, Φ3, and Φ4. Three nibbles, bits (d4, d5, d6, d7)84; (d8, d9, d10, d11)86; (d12, d13, d14, d15)88; respectively, are mapped to the phase parameters Φ2, Φ3, and Φ4 as indicated in the table 110 of FIG. 5. In other words, the values of bits of the three nibbles are used to select one of 256 subcodes 92.

Since the phase parameter $\phi_1$ is common to all chips of the codeword, it is used to differentially modulate the codeword. The phase parameter $\phi_1$ 94 is encoded 96 by initially mapping the values of the four data bits $d_0$, $d_1$, $d_2$, and $d_3$ to one of two values of $\phi_1$ as indicated in the table 112 in FIG. 6. The final value of the phase parameter $\phi_1$ is the result of differential modulation or 180° rotation of successive phase parameters. As each phase parameter $\phi_1$ is selected, the indexer 98 is advanced to rotate the phase parameter $\phi_1$ of the next successive codeword. The phase of the selected subcode is rotated by the phase parameter $\phi_1$ in a phase rotation unit 100 resulting in the selection of one of 4096 codewords 102 by 16 data bits. Since the signals of the extended data rate system of the present invention are structurally similar to the symbols of the high data rate (IEEE 802.11b) systems only minor changes are required in the design of the transceiver and compatibility with legacy systems is maximized.

The M-ary modulation of the extended data rate wireless system provides increased data capacity by encoding additional information in each transmitted codeword. Extensions to higher data rates are feasible by increasing the number of phase shifts and, appropriately, increasing the number of information bits encoding each phase shift. Even with higher data rates, the system utilizes the same spectrum and a signal that is structurally similar to QPSK signals maximizing the interoperability with QPSK modulated wireless systems.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of direct sequence spread spectrum modulation comprising the steps of:
   (a) segmenting a serial bit stream into at least two successive bit segments comprising a plurality of data bits;
   (b) selecting a first modulation codeword phase parameter as a function of a first plurality of at least four bit values of a bit segment and a sequential order of said bit segment in said succession of bit segments;
   (c) selecting a second modulation codeword phase parameter as a function of a second plurality of at least four bit values of said bit segment;

(d) selecting a third modulation codeword phase parameter as a function of a third plurality of at least four bit values of said bit segment;

(e) selecting a fourth modulation codeword phase parameter as a function of a fourth plurality of at least four bit values of said bit segment; and (f) generating said modulation codeword as a function of said first, said second, said third, and said fourth phase parameters.

2. The method of claim 1 wherein the step of generating said modulation codeword comprises the step of selecting said modulation codeword as a function of said first, said second, said third, and said fourth pluralities of phase parameters.

3. The method of claim 1 wherein the step of generating said modulation codeword comprises the steps of:

(a) selecting a subcode as function of said second, said third, and said fourth phase parameters; and (b) selecting a rotated codeword as a function of said subcode and said first phase parameter.

4. A method of direct sequence spread spectrum modulation comprising the steps of:

(a) segmenting a serial bit stream into at least two successive bit segments comprising a plurality of data bits;

(b) selecting a subcode as a function of values of a first plurality of bits of a bit segment;

(c) selecting a codeword phase rotation parameter as a function of values of a second plurality of at least four bits of said bit segment and a sequential order of said bit segment in said succession of bit segments; and (d) selecting a spread spectrum modulation codeword as a function of said subcode and said codeword phase rotation parameter.

5. The method of claim 4 wherein said first plurality of bits comprises at least twelve bits.

6. A direct sequence spread spectrum modulator comprising:

(a) a serial to parallel converter to segment a serial bit stream into at least two successive parallel bit segments, each comprising a plurality of data bits;

(b) a subcode generator selecting one of a plurality of subcodes as a function of a first plurality of data bits of a bit segment;

(c) a segment indexer registering a sequential order of said at least two parallel bit segments;

(d) a differential phase encoder selecting a codeword rotation phase as a function of values of at least four bits of said bit segment; and (e) a phase rotator to select a codeword as a function of said subcode and said codeword rotation phase.

7. A method of direct sequence spread spectrum modulation comprising the steps of:

(a) segmenting a serial bit stream into a plurality of successive bit segments, each bit segment comprising a plurality of data bits;

(b) mapping each of selected ones of said bit segments to a set of codeword phase parameters as a function of a sequential order of said bit segments in the serial bit stream to generate a first subcode;

(c) mapping a selected one of said bit segments to a selected codeword phase parameter to generate a differential modulator subcode;

(d) modulating the first subcode with the differential subcode to produce a modulation codeword.

8. The method of claim 7 wherein the selected codeword phase parameter is a phase parameter common to the phase values of chips encoded in a Hadamard transform function.

9. The method of claim 7 further including the step of changing the phase of the differential subcode by a preselected phase shift value on each sequential performance of step (c).

* * * * *